Aug. 15, 1944.   E. JEPSEN   2,355,732
WEED KILLING IMPLEMENT
Filed July 20, 1942
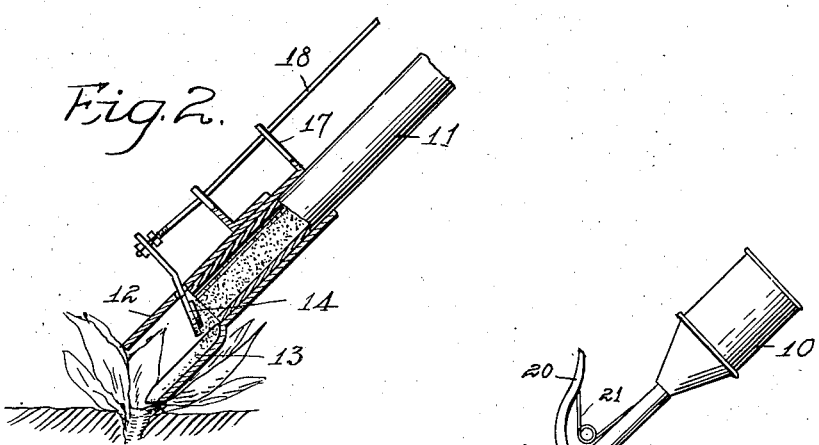
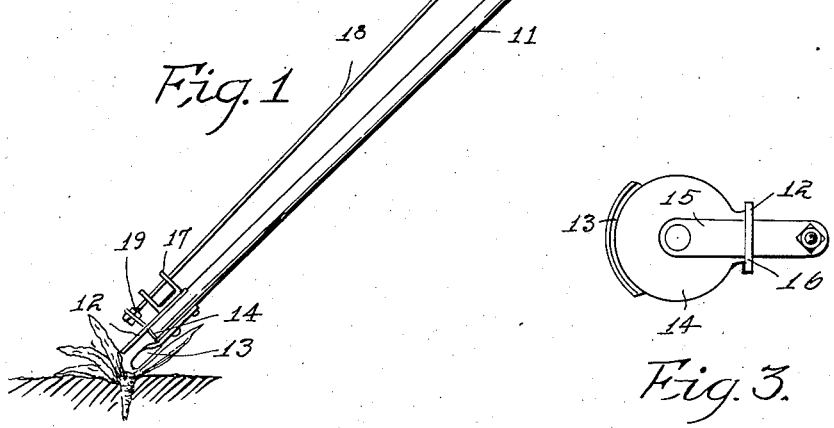
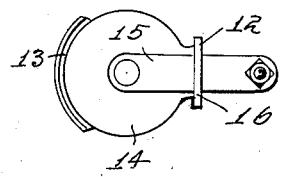
Inventor
Erik Jepsen Patented Aug. 15, 1944

2,355,732

UNITED STATES PATENT OFFICE 2,355,732

WEED KILLING IMPLEMENT

Erik Jepsen, Cincinnati, Ohio

Application July 20, 1942, Serial No. 451,673

3 Claims. (Cl. 47—49)

My invention relates to that class of implements intended to be used in applying a poisonous powder to the heart of a weed and which, when thus applied, will kill the weed.

The object of my invention is to provide an implement of this class of simple, durable and inexpensive construction that may be easily carried and operated by an operator in an upright standing position and which may be easily and conveniently operated first to utilize a finger of the implement to remove from the heart or center of a weed any leaves or covering, and, next, to place the poison conducting spoon in a position firmly resting upon the earth at the side of the weed heart or center opposite from the said finger, and whereby the finger and spoon will cooperate in clearing a space directly over the heart or center of the weed so that the poison powder will be accurately applied to the heart or center of the weed and not be distributed over the leaves of the weed or over the lawn surrounding the weed, and further to provide a valve device for delivering any desired predetermined amount of the poison powder directly into the spoon by which it is conducted to the heart or center of the weed and preventing any of the poison powder from being blown or spilled at places other than the heart or center of the weed.

In the accompanying drawing—

Figure 1 shows a side elevation of my improved implement at substantially the proper angle for use;

Figure 2 shows an enlarged detail side view of the weed spreading finger and the poison powder delivery spoon and implement support, and also showing the valve in position for delivering poison powder to the spoon; and Figure 3 shows an enlarged lower end view of the implement.

At the top of the implement is a hopper 10 for containing poison powder; communicating with it is the conducting tube and implement handle 11.

At the lower end of the handle 11, at the side which is uppermost when in use, is the weed leaf spreading or removing finger 12 projected downwardly from the handle. At the lower end of the handle at the side opposite from the finger 12 is the poison delivery spoon or guide 13 which projects downwardly from the handle further than the finger 12, to such an extent that it may rest upon the earth or a relatively firm part of the weed when the handle is in the position shown in Figure 1, and whereby the implement may be firmly held in the desired position relative to the weed to prevent movement of the implement during a weed killing operation, so that the poison powder is not spilled to points other than the heart or center of the weed. Furthermore, by having the said finger and spoon arranged at opposite sides of the point at which poison powder is delivered, and when operating under conditions when a wind is blowing, the operator may place the implement at such position relative to the path of the wind that it will not blow the powder off of the spoon.

For controlling the discharge of poison powder and directing it to the spoon I have provided the following: A circular valve 14 is fixed to a lever 15, which extends through a slot 16 in the finger 12, the valve when closed engages the lower end of the tubular handle. Fixed to the finger 12 above the lower end of the handle is a bracket 17 through which is slidingly extended a valve rod 18. Its lower end is adjustably connected to the lever 15 by nuts 19 on the valve rod 18 at opposite sides of the lever 15. Pivoted to the upper portion of the handle is a hand-operated lever 20 connected to the valve rod 18, and a spring 21 yieldingly holds the lever 20 in position for closing the valve 14.

Attention is directed to the fact that the fulcrum for the valve 14 is on the side of the tubular handle opposite from the spoon, so that when the valve is more or less opened, the poison powder will be delivered by gravity to the longitudinal center of the spoon which will conduct it to the head or center of the weed.

In practice, the operator grasps the handle 10 and the handle 20 in one hand and holds the implement at about the angle shown in Figure 1. He then utilizes the finger 12 in moving aside any of the weed leaves or other obstructions above the heart or center of the weed. The spoon 13 may also in some cases be used for this purpose. When the heart or center of the weed is thus exposed, the spoon is rested upon the ground or a firm portion of the weed, to thereby hold it firmly in position accurately centered above the heart or center of the weed. When this has been done the operator moves the handle 20 thereby depositing a quantity of the poison powder by gravity to the upper longitudinal center of the spoon which conducts it to the lower end of the spoon which is fixed in position at the heart or center of the weed, thereby assuring that the poison powder is not deposited on the outer leaves of the weed or upon the lawn from which the weeds are being eliminated. The operator may clearly see the amount of poison powder being delivered at any time and will quickly learn to manipulate the valve in such manner as to deliver the desired amount of poison powder suitable for the size of the weed being killed, thereby economizing in the use of the powder and avoiding spreading excess powder on the lawn.

I claim as my invention:

1. An implement, comprising a container for material, a tubular handle attached to and communicating with the container and open at its lower end, a finger fixed to and extended downwardly beyond the tubular handle at one side thereof, a spoon fixed to and extended downwardly beyond the lower end of the tubular handle at the side opposite said finger, a valve for closing the lower end of the tubular handle, a lever fixed to the valve and fulcrumed to said finger so that when the valve is partially open the material within the tube will be directed toward the spoon, a valve operating handle attached to the upper portion of the tubular handle for operating the valve, and a rod connecting the valve handle to the lever.

2. An implement, comprising a container for material, a tubular handle attached to and communicating with the container and open at its lower end, a finger fixed to and extended downwardly beyond the tubular handle at one side thereof, a spoon fixed to and extended downwardly beyond the lower end of the tubular handle at the side opposite said finger, a valve for closing the lower end of the tubular handle, a lever fixed to the valve and fulcrumed to said finger so that when the valve is partially open the material within the tube will be directed toward the spoon, a valve operating handle attached to the upper portion of the tubular handle for operating the valve, a rod connecting the valve handle to the lever, and a bracket fixed to said finger for slidingly supporting said rod.

3. An implement, comprising a container for material, a tubular handle attached to and communicating with the container and open at its lower end, a finger fixed to and extended downwardly beyond the tubular handle at one side thereof, a spoon fixed to and extended downwardly beyond the lower end of the tubular handle at the side opposite said finger, a valve for closing the lower end of the tubular handle, a lever fixed to the valve and fulcrumed to said finger so that when the valve is partially open the material within the tube will be directed toward the spoon, a valve operating handle attached to the upper portion of the tubular handle for operating the valve, a rod connecting the valve handle to the lever, a bracket fixed to said finger for slidingly supporting said rod, and a spring for yieldingly holding the valve in closed position.

ERIK JEPSEN.